United States Patent [19]
Graham

[11] Patent Number: 5,422,919
[45] Date of Patent: * Jun. 6, 1995

[54] EMI SUPPRESSION CODING

[75] Inventor: Martin H. Graham, Berkeley, Calif.

[73] Assignee: Tut Systems, Inc., Pleasant Hill, Calif.

[ * ] Notice: The portion of the term of this patent subsequent to Feb. 1, 2011 has been disclaimed.

[21] Appl. No.: 150,451

[22] Filed: Nov. 10, 1993

Related U.S. Application Data

[63] Continuation of Ser. No. 964,508, Oct. 21, 1992, Pat. No. 5,283,807.

[51] Int. Cl.⁶ .............................................. H04L 27/30
[52] U.S. Cl. ..................................... 375/200; 380/34; 380/46; 380/49
[58] Field of Search .............................. 375/1, 17-20, 375/62, 66, 68, 85, 86, 89; 380/9, 34, 46, 49

[56] References Cited

U.S. PATENT DOCUMENTS

| | | | |
|---|---|---|---|
| 3,795,865 | 3/1974 | Armstrong | 375/1 X |
| 3,798,544 | 3/1974 | Norman | 375/1 X |
| 4,462,105 | 7/1984 | Wagner et al. | 375/20 X |
| 4,486,740 | 12/1984 | Seidel | 375/19 X |

*Primary Examiner*—Bernarr E. Gregory
*Attorney, Agent, or Firm*—Blakely, Sokoloff, Taylor & Zafman

[57] ABSTRACT

EMI suppression technique that pseudorandomizes the positive or negative going transitions that are used to represent one binary state in a transmitted digital signal such as in MLT-3 data format. By pseudorandomizing the selection of these transitions, substantial spreading of the spectral energy occurs. Descrambling need not occur since each transition is recognized as the encoded binary state. Thus, the data sender can encode the data and suppress EMI without any changes to the receiver's equipment.

8 Claims, 2 Drawing Sheets

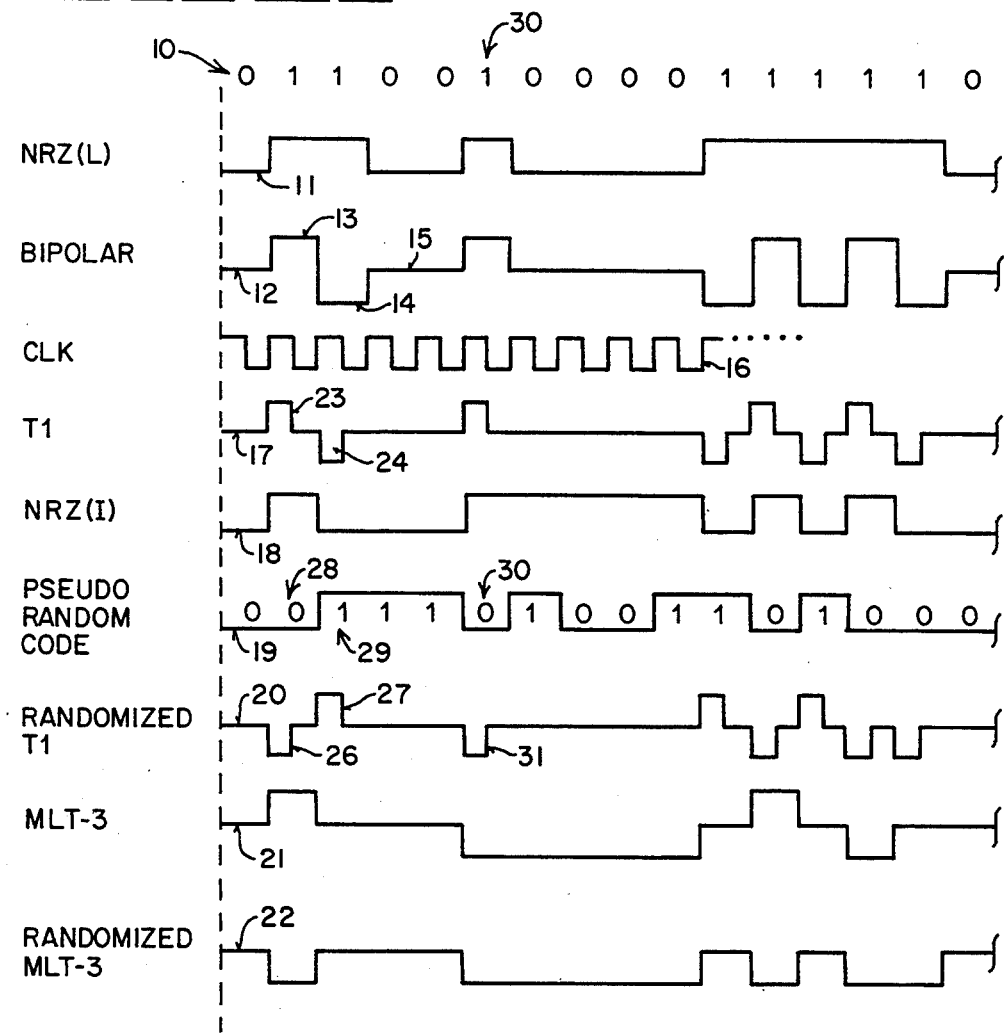
FIG_1
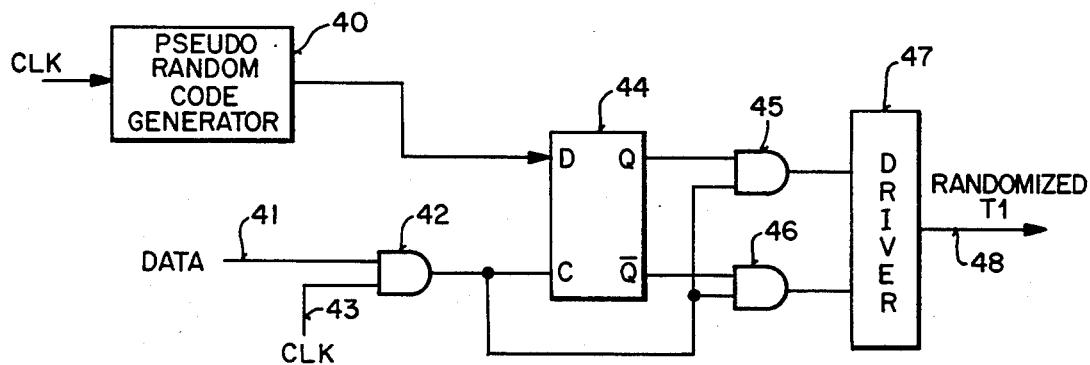
FIG_2

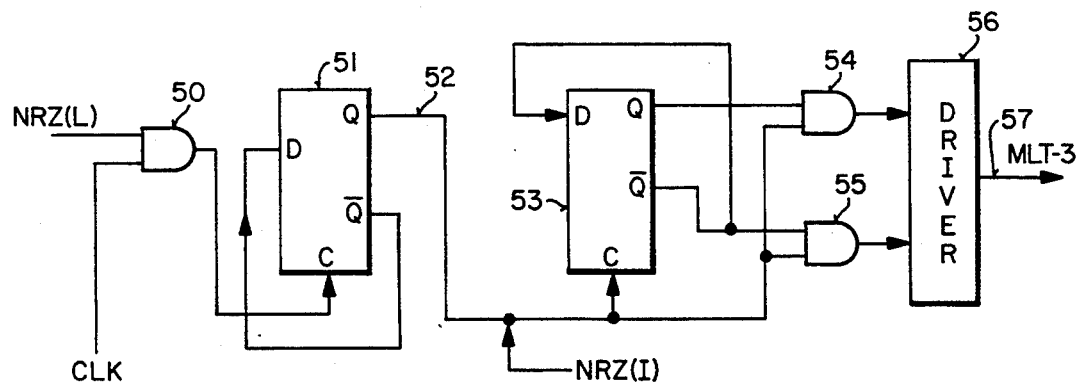
FIG_3 (PRIOR ART)
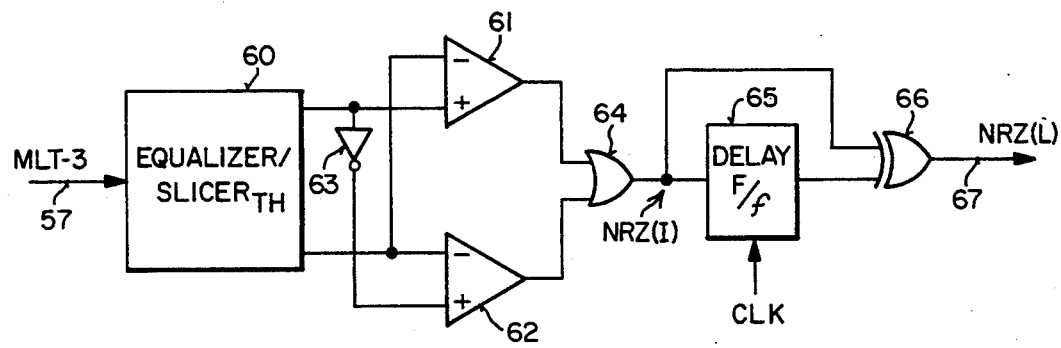
FIG_4 (PRIOR ART)
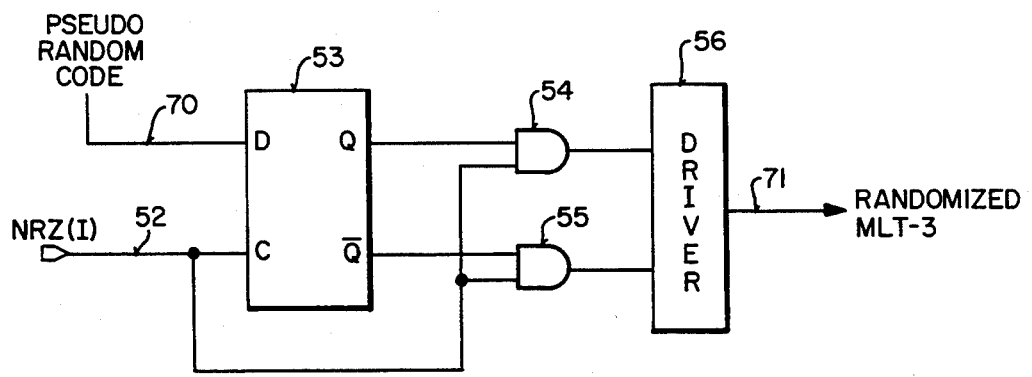
FIG_5

EMI SUPPRESSION CODING

This is a continuation of application Ser. No. 07/964,508, filed Oct. 21, 1992, now U.S. Pat. No. 5,283,807.

BACKGROUND OF THE INVENTION

1. Field of the Invention

The invention relates to the field of electromagnetic interference (EMI) suppression and digital coding techniques used to suppress the interference.

2. Prior Art

Some digital data encoding techniques uses three signal levels to encode two digital states. The bipolar format used in "T1" uses a zero signal level to represent a binary 0 and a positive or negative level to represent a binary 1. The positive and negative levels are alternated to ensure a zero DC level independent of the data which is encoded. The properties of this carrier system as well as others, are discussed in *Digital Transmission Systems*, by David R. Smith, published by Van Norstrand, Reinhold Company (1985) particularly in Chapter 5 entitled: "Baseband Transmission".

In a high bit rate bipolar system, when certain code sequences are transmitted such as a string of binary ones, electromagnetic interference (EMI) occurs which may exceed set regulatory levels. This is particularly true since EMI is often measured over relatively narrow frequency bands.

One technique to reduce EMI is to scramble the data prior to transmission and descramble it at the receiver. This scrambling can take the form of exclusively oring the data stream with a pseudorandom code sequence. To descramble, the received signals is exclusively ored with the same pseudorandom code sequence used for scrambling. This of course requires synchronization between the two pseudorandom code sequences. This is sometimes accomplished by using a predetermined algorithm which is synchronized at the transmitter and receiver.

As will be seen, the present invention provides EMI suppression particularly for an encoding mechanism employing three distinct signal characteristics, such as three levels, by randomizing the transmitted signal. However, as will be seen this randomizing does not alter the decoded data signal. Consequently, no descrambling is needed.

SUMMARY OF THE INVENTION

A method and apparatus for suppressing electromagnetic interference (EMI) is described particularly for a system which communicates data by encoding one data state with two different signal characteristics such as two different signal levels. With the present invention, the selection between the two different signal characteristics for the one data state is pseudorandom as opposed to being alternated. This spreads the frequency spectrum thereby reducing measured EMI.

BRIEF DESCRIPTION OF THE DRAWINGS

FIG. 1 is a plurality of waveforms used to describe the prior art and the present invention.

FIG. 2 is an electrical schematic showing one embodiment of the present invention.

FIG. 3 is an electrical schematic of a prior art encoder.

FIG. 4 is an electrical schematic of a prior art decoder.

FIG. 5 illustrates a portion of the encoder of FIG. 3 with the improvement of the present invention.

DETAILED DESCRIPTION OF THE PRESENT INVENTION

Electromagnetic interference (EMI) suppression method and apparatus is described for digitally encoded data. In the following description, numerous well-known circuits and techniques are not described in detail in order not to unnecessarily obscure the present invention. In other instances, specific waveforms and circuits are provided in order to provide a thorough understanding of the present invention, it will be obvious, however, to one skilled in the art that the present invention may be practiced without these specific details.

Referring first to FIG. 1, a bit stream 10 of digital data is represented by zeros and ones. The waveforms below this bit stream illustrate various methods of encoding the data represented by the bit stream 10. The bit stream 10 may have been previously encoded with, for example, the 4 to 5 FDDI coding.

Waveform 11 represents the data stream 10 using the well-known nonreturn-to-zero (NRZ) coding, more specifically, NRZ(L). This waveform has two levels: the lower level indicating a binary 0 and the upper level a binary 1.

Waveform 12 illustrates the bit stream encoded in another well-known manner where three discrete signal levels are used: a zero level, a positive level and a negative level. A binary 1 is represented by either the positive or negative levels, the binary 0 is represented by the zero level. With this encoding a transition occurs with each binary 1 and the positive and negative levels are alternated to avoid a DC component in the signal. By way of example, the first two binary ones of the bit stream 10 cause a transition to the positive level 13 and then to the negative level 14. The following binary 0 in the bit stream causes a transition to the zero level 15.

The waveform 16 simply represents a clocking signal with a period equal to the bit period shown for the various waveforms of FIG. 1. When this clocking signal is anded with the NRZ(L) signal a return-to-zero (RZ) encoding results. The waveform 17 is the widely used "T1" carrier system which results from anding waveforms 11 and 16 and alternating the transitions such as was done for waveform 12.

The NRZ(l) waveform 18, also well-known, can be generated directly from the NRZ(L) signal along with the clocking signal 16 as will be shown in conjunction with FIG. 3.

The MLT-3 waveform 21 also is a well-known encoding technique, its generation is described in conjunction with FIG. 3.

Waveform 19 represents a pseudorandom code sequence which may be generated with any one of a plurality of well-known pseudorandom generators. As will be seen, this pseudorandom code is used to select or control, for example, whether a binary 1 of a randomized representation of waveform 17 will be represented by a positive or negative level.

As mentioned earlier, the prior art encoding represented by waveforms 12 and 17 alternates between positive and negative transitions to represent a binary 1. With the present invention, the pseudorandom code of waveform 19 controls the selection of either the positive or negative levels. For instance, while the positive level 23 represents the first binary 1 of the bit stream 10 of waveform 17, a negative level 26 (waveform 20) is used as taught by the present invention. The determination to use a negative level is governed by the low level of the pseudorandom code sequence 19 at time 28. The next binary 1 of the bit stream 10 is represented by a positive level 27 since at time 29 the pseudorandom signal 19 is high. When the next binary 1 occurs in the bit stream 10 (time 30), a negative level 31 is used to represent this binary 1 since at time 30 the waveform 19 is low. As will be discussed later, randomizing the selection of the positive and negative transitions of the waveform 20, spreads the spectral content of the signal. This has the effect of reducing the EMI.

In a prior art receiver/decoder each transition from zero is detected as a binary 1 for the waveform 20. The direction of the transition, (i.e., positive going or negative going) is not significant. Therefore, the receiver need not know the pseudorandom code sequence used for encoding the waveform 20. Thus, while the transmitted waveform is scrambled by the pseudorandom signal, the receiver need not know that this has occurred and certainly does not need to know the specific randomized code sequence or algorithm used to randomize the transmitted signal. Since the selection between the positive going and negative going transitions of waveform 20 are randomized, the net result will be no net DC current.

A circuit for providing the waveform 20 is shown in FIG. 2. The pseudorandom code generator 40 provides the waveform 19 to the D terminal of a flip-flop 44. The data represented by the waveform 11 is coupled by line 41 to one input terminal of an AND gate 42. The clocking signal 16 is coupled by a line 43 to the other input terminal of the AND gate 42. (The clocking signal is also used by the generator 40 to synchronize the output of the generator 40.) The output of AND gate 42 is coupled to the clock terminal of the flip-flop 44 and to one input terminal of each of the AND gates 45 and 46. As would be obvious to one skilled in the art, the clocking signal supplied to AND gate 42 is delayed so that any transitions in the output of the generator 40 occur before any transitions in the output of AND gate 42. This ensures that the pseudorandom code of waveform 19 received by the D terminal of flip-flop 40 transitions and is stable before clocking the flip-flop 40. The other input terminal of AND gate 45 receives the Q output of flip-flop 44 and the other terminal of the AND gate 46 receives the Q output of the flip-flop 44. The driver 47 which may be a well-known circuit, provides a positive going transition on line 48 when the output of the gate 45 is high and a negative going transition on line 48 when the output of gate 46 is high. When the output of gates 45 and 46 are both low, as will occur anytime the data on line 41 is low, a 0 level signal is provided on line 48. Thus, by coupling the waveforms shown in FIG. 1 to the circuit of FIG. 2, the randomized waveform (shown as randomized T1) is provided on line 48. For the particular positive and negative transitions shown in waveform 20, it is assumed that the flip-flop 44 is in one predetermined state upon initialization. This is not significant since if the flip-flop 44 were in its other state upon initialization, the waveform 20 would simply be reversed, that is all the positive pulses would become negative pulses, and all the negative pulses would be positive pulses.

FIGS. 3, 4 and 5 are used to illustrate a prior art coding and decoding circuit and the change which is made to the encoding circuit to implement the present invention. When the present invention is used, the prior art decoder/receiver of FIG. 4 may be used without change.

Referring now to the prior art encoder of FIG. 3, it receives the NRZ(L) signal at one input terminal of the AND gate 50; the other input terminal of this AND gate receives the clocking signal. These signals correspond to the waveforms 11 and 16, respectively of FIG. 1. The output of gate 50 is applied to the clock input terminal of flip-flop 51. The Q output of flip-flop 51 is applied to the D input of this flip-flop. The signal on the Q terminal of the flip-flop (line 52) is the well-known NRZ(I) signal shown as waveform 18 of FIG. 1. This signal is coupled to the clock terminal of the flip-flop 53 and one input terminal of each of the AND gates 54 and 55. The other input terminal of the AND gate 54 is coupled to the Q terminal of flip-flop 53; the Q terminal of this flip-flop is coupled to the other input terminal of the AND gate 55. The driver 56 provides the MLT-3 signal (line 57) shown as waveform 21 of FIG. 1. Again, as was the case with the driver of FIG. 2, when the output of the AND gate 54 is high the signal on line 57 is high; when the output of the AND gate 55 is high, the signal on line 57 is low; and, when the outputs of both the AND gates are low, the signal on line 57 is at the zero level. The connection between the Q terminal of the flip-flop 53 and the D terminal of the flip-flop assures that the positive going and negative going transitions from the zero level of the signal on line 57 alternate.

The prior art decoder of FIG. 4 receives the signal on line 57 at an equalizer/slicer 60. This well-known circuit provides a threshold voltage for the comparators 61 and 62. The MLT-3 signal (waveform 21 of FIG. 1) is coupled to the negative terminal of the comparator 61; and, the inverse of this signal (through the inverter 63) is coupled to the negative terminal of the comparator 62. The outputs of the comparator 61 and 62 are coupled to the OR gate 64. The output of this OR gate is the NRZ(I) signal which is coupled to one input terminal of exclusive OR gate 66. The NRZ(I) signal after being delayed by one clock time in the flip-flop 65, is coupled to the other input terminal of this exclusive OR gate. The output of the gate 66 is the NRZ(L) signal (line 67).

To implement the present invention with the prior art circuits of FIGS. 3 and 4 requires that the pseudorandom code be coupled to the D terminal of the flip-flop 53 as shown in FIG. 5. That is, by way of example, the output of a pseudorandom code generator 40 of FIG. 2 is coupled via a line 70 to the flip-flop 53. Placing the pseudorandom code on the D terminal of this flip-flop (rather than the Q signal as shown in FIG. 3) causes the negative and positive going transitions of the MLT-3 signal to be randomized. Consequently, the output signal on line 71 will correspond to the waveform 22 of FIG. 1 again assuming that the flip-flops are in predetermined states upon initialization. Otherwise a reversal of this waveform may occur. As mentioned, this randomized waveform may be decoded by the prior art circuit of FIG. 4 without change to the circuit of FIG. 4.

In the prior art, as previously mentioned, data is sometimes scrambled on encoding and descrambled on decoding to spread the spectral energy and thereby reducing EMI. With the present invention, particularly with encoding techniques such as T1 or MLT-3, the benefits of the spectral spreading can be obtained without the complexity associated with the descrambling.

The present invention may also be used where an algorithm is used to generate the code represented by the waveform 19 of FIG. 1. The algorithm may be used to obtain a predetermined spectral characteristic in the transmitted signal That is, instead of a pseudorandom code, the code generated using the algorithm can be tailored to achieve some predetermined spectrum.

For example, if the clock rate for the data being transmitted is 100 MHz and a notch in the EMI spectrum is desired at 35 MHz, the data can be examined by passing it through a 35 MHz band pass filter to determine the signal content at 35 MHz. Where the spectral content is found to be high at the output of the filter, a predetermined bit pattern can be forced into the pseudorandom code to cause the spectral energy at 35 MHz to be shifted to a higher or lower frequency. More specifically, referring to FIG. 3 a delay is added into the signal on line 52 to allow the NRZ(1) signal to be examined for the 35 MHz component. The filter's input is coupled to line 52 and its output is coupled to a code generator such as generator 40 of FIG. 2. When the filter's output indicates a high signal content at 35 MHz, a predetermined code sequence is applied to the D terminal of the flip-flop 53 to cause the energy at this frequency to be shifted either to a higher frequency or lower frequency.

Thus, a method and apparatus has been described which suppresses EMI by randomizing the transmitted signal, without requiring descrambling at the decoder.

I claim:

1. In a method for communicating binary data where one binary data state is represented by either one of two different signal levels, and another binary data state is represented by another signal level different than said two different signal levels, an improvement comprising the steps of:
   generating a pseudorandom signal;
   selecting between said two different signal levels as a function of said pseudorandom signal; and,
   recovering said binary data without the use of said pseudorandom signal.

2. The improvement defined by claim 1 wherein said pseudorandom signal comprises a stream of pseudorandom digital signals.

3. In a method for communicating digital data where one binary state is represented by either one of two different signal levels and the other binary state is represented by a third signal level, different than said other two different signal levels, an improvement comprising the steps of:
   providing a pseudorandom signal;
   selecting between two different signal levels as a function of said pseudorandom signal to identify said one binary state; and
   selecting said third signal level to identify said other binary state.

4. In a method for communicating digital data where one digital state of data is represented by a signal having a signal level of approximately zero and the other digital state of data is represented by alternating between positive and negative signal levels, an improvement to reduce certain electromagnetic interferences comprising the steps of:
   using said signal level of approximately zero to represent said one digital state; and,
   pseudorandomly selecting between said positive and negative signals to represent the other digital state wherein the other digital state is recovered without the use of said pseudorandom signal.

5. In a method of communicating a digital signal where alternating between two signal levels is used to signify a binary data state, an improvement comprising:
   generating a pseudorandom signal;
   using said pseudorandom signal to select between said two signal levels for communicating said binary data state: and,
   recovering said binary data state without using said pseudorandom signal.

6. In a method of communicating a digital signal where alternating between two signal levels is used to signify one binary data state, an improvement comprising:
   using a control signal to select between said two signal levels; and,
   generating said control signal based on an algorithm which prevents alternating between said two signal levels; and,
   recovering said one binary data state without said control signal.

7. The improvement defined by claim 6 wherein said control signal is selected to provide a predetermined spectral response in said digital signal.

8. A communication system comprising:
   an encoder comprising;
   an encoder means coupled to receive said digital signal for encoding said digital signal such that one binary state is represented by either one of two different signal levels,
   a signal generator for generating a pseudorandom signal; and,
   a selector for selecting between said two different signal levels under control of said pseudorandom signal;
   a decoder comprising means for recognizing said two different signal levels as representing said one binary state without the use of said pseudorandom signal; and,
   a link coupled between said encoder and decoder.

* * * * *